Sept. 1, 1959  C. C. SIMMONS  2,902,103
SPLASH GUARD
Filed Feb. 3, 1958

CLARENCE C. SIMMONS
INVENTOR.

BY
ATTORNEY

# United States Patent Office 2,902,103
Patented Sept. 1, 1959

2,902,103

SPLASH GUARD

Clarence C. Simmons, Ada, Okla.

Application February 3, 1958, Serial No. 712,875

2 Claims. (Cl. 180—69.1)

The present invention relates to automotive vehicles, or the like, and has reference more particularly to a splash guard for the engine thereof.

Most automobile engines are supported between and above the forward end portion of the automobile frame. A number of the engines currently used in automobiles, particularly V–8 type engines, are presently designed so that the spark plugs thereof are disposed in such a position on the opposing sides of the engine that mud and water frequently splash upwardly into contact with the plugs and connecting wires thereby shorting out the engine.

The principal object of the present invention is to provide a splash guard which may be connected to the lower surface of the forward end frame structure of an automobile and span the distance therebetween.

Another important object is to provide a splash guard formed of flexible sheet material which may be connected to the under surface of the respective opposing control arms of the wheel suspension members and surround the forward end portion of the crank case and thus prevent substantially all mud and water thrown upwardly by the wheels from coming in contact with the sides of the engine.

Another object is to provide a splash guard having a reinforced peripheral edge formed to fit the structure of the lower surface of the forward end of a vehicle.

Another object is to provide a flexible splash guard of this class, the rearward side portions of which may be connected to and reciprocate vertically with the control arms and which includes support means extending inwardly of the lateral sides of the splash guard for supporting the peripheral edge thereof adjacent the forward end of the crank case.

A further object is to provide a splash guard which will prevent "drowning out" an engine in rainy weather and which will prevent mud, dirt, and dust from being thrown upward into contact with the sides of the motor.

Yet another object is to provide a device of this character which may be formed of one piece of reinforced sheet material and which is easily connected to the existing parts of a vehicle.

The present invention accomplishes these and other objects by providing a unitary section of flexible reinforced sheet material substantially rectangular in general configuration but having recesses in the periphery of the lateral and rearward edges thereof which conform to the structural parts of the under surface of the forward end of the vehicle. Bolt and washer means connect the forward end of the splash guard to the under surface of the forward end of the vehicle frame. Support arms carried by bolt means connecting the splash guard to the control arms extend inwardly of the splash guard for supporting the latter in closely spaced relation around the forward end of the crank case.

Other objects will be apparent from the following description when taken in conjunction with the accompanying single sheet of drawings, wherein.

Like characters of reference designate like parts in those figures of the drawings in which they occur.

In the drawings.

Figure 1:
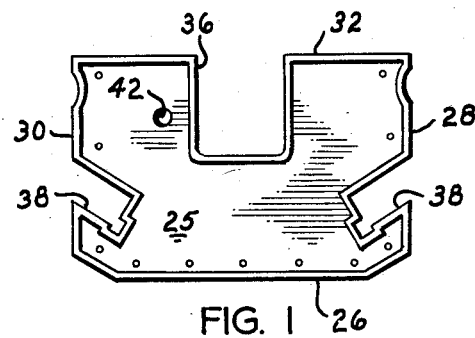
Figure 1 is a bottom plan view of the device.
Figure 2:
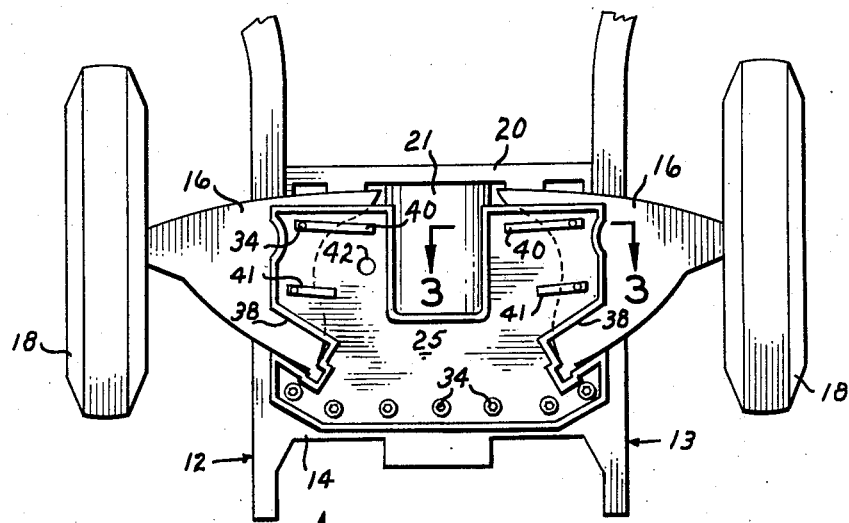
Figure 2 is a simplified bottom plan view of the forward end of the vehicle.
Figure 3:
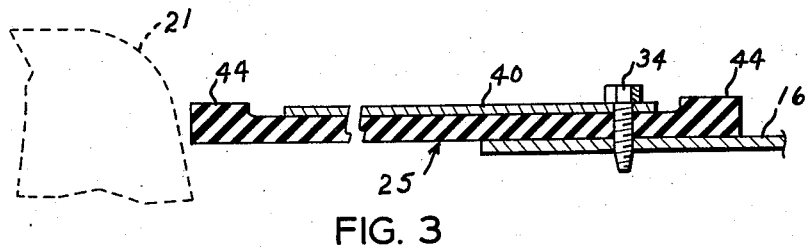
Figure 3 is a fragmentary cross-sectional view taken substantially along line 3—3 of Fig. 2, a fragment of the crank case being shown by dotted lines.

The reference numeral 10 indicates, as a whole, the forward end portion of an automotive vehicle including frame sides 12 and 13, front frame cross member or frame end 14, a pair of oppositely disposed control arms or wheel suspension members 16 pivotally connected to the frame and projecting laterally outward therefrom. A wheel 18 is connected to the outer end portion of each respective control arm. The front end portion of the vehicle further includes an intermediate cross member 20 extending between and connected with the frame sides 12 and 13 rearwardly of the engine crank case 21 which projects downwardly between the frame sides 12 and 13. It is with such vehicle structure that the instant invention is designed to be used.

In carrying out the invention a sheet of flexible material is cut or formed substantially rectangular in general configuration to form a splash guard 25 having a forward side or edge 26, lateral ends or sides 28 and 30 and a rearward side or edge 32. The over-all size of the guard 25 is preferably such that it will span the distance between the frame sides 12 and 13 and extend from the front cross member 14 rearwardly to a point adjacent the intermediate cross member 20 for the purposes more fully explained hereinbelow.

The guard 25 is preferably formed of rubber or similar flexible material and suitably reinforced by cording or the like, not shown, being vulcanized to the rubber. The forward side or edge 26 of the guard is formed to substantially conform to the contour of the frame front cross member or support 14 and is flatly connected to the lowermost surface thereof by a plurality of metal screws and washers 34 extended through the guard and engaged within suitable holes or perforations drilled into the member 14. The rearward edge 32 is formed with a forwardly extending central recess 36 adapted to closely receive the forward end portion of the crank case 21 therein.

The respective sides 28 and 30 of the guard are each provided with substantially rectangular recesses 38 for fitting over or receiving the forward side edge of the respective A-frame or control arm 16 therein. The remaining rearward portions of the sides 28 and 30 which lie on opposing sides of the crank case recess 36 flatly contact the under side surface of the respective control arms. Additional screws 34 secure these side portions of the guard to the control arms. These rearward side sections of the guard which are secured to the control arms reciprocate vertically with the arms. Support arms 40 and 41 in the form of strap metal strips held in place by the screws 34 flatly contact the lower surface of the guard and extend inwardly toward the crank case 21 and provide a support for the free edge of the guard defining the crank case recess 36. Thus, it may be seen that the guard substantially closes the openings within the frame and around the engine through which water may be splashed by the wheels or dirt and mud thrown upwardly into contact with the engine.

The guard 25 may be easily moulded to the desired configuration as described herein with various slight modifications to fit individual vehicles. For example, an oil pipe breather hole may be cut in the guard as at 42 where desired. Further, in forming the guard, as by molding, it is desired that a heavier or additionally reinforced peripheral edge be provided, as at 44, to strengthen the device.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A splash guard construction in operative association with a vehicle having a frame comprising, parallel spaced-apart side members and a forward end portion, said vehicle having a pair of oppositely disposed wheel suspension members pivotally carried at one end by said side members in spaced relation with respect to their forward ends for vertical reciprocating movement, said vehicle having a crank case between said side members depending below the plane formed by the lower surfaces of the latter comprising: a substantially rectangular section of flexible sheeting material adapted to span the distance between the sides of said frame and having one side edge co-extensive with and flatly secured to the lower surface of the forward end portion of said frame, said sheet material having a recess in its periphery adapted for closely receiving the forward end portion of said crank case, said sheet material having an enlarged reinforced peripheral edge; bolt means securing the laterally disposed edges of said sheet material to the respective adjacent wheel suspension member for vertical reciprocation therewith; and support arms carried by said bolt means and projecting inwardly therefrom in contact with the lower surface of said sheet material for supporting the edge of said sheet material surrounding the crank case recess.

2. A splash guard construction in operative association with a vehicle having a frame comprising, parallel spaced-apart side members and a forward end portion, said vehicle having a crank case between said side members depending below the plane formed by the lower surfaces of the latter, said vehicle having an intermediate cross member extending transversely of the frame rearwardly of the forward end of the crank case, said vehicle having a pair of oppositely disposed laterally extending wheel suspension members pivotally connected at one end by the respective opposing sides of the frame forwardly of said intermediate cross member for vertical reciprocating movement, comprising: a substantially rectangular section of reinforced flexible sheeting material adapted to span the distance between the sides of said frame and having one side edge co-extensive with and flatly secured to the lower surface of the forward end portion of said frame, said sheet material extending rearwardly of the forward end portion of said frame and underlying that portion of both said wheel suspension members projecting inwardly of the sides of said frame, said sheet material having a recess in its rearwardly disposed side edge adapted for closely receiving the forward end portion of said crank case, said sheet material having an enlarged reinforced peripheral edge; bolt means securing the laterally disposed edges of said sheet material to the lowermost surface of the respective adjacent wheel suspension member for vertical reciprocation therewith; and support arms carried by said bolt means and projecting inwardly toward said crank case in contact with the lower surface of said sheet material for supporting the edge of said sheet material surrounding the crank case recess.

References Cited in the file of this patent

UNITED STATES PATENTS

| 1,524,434 | Heinemann et al. | Jan. 27, 1925 |
| 2,126,943 | Best | Aug. 16, 1938 |
| 2,171,813 | Stockstrom | Sept. 5, 1939 |